United States Patent
Kotchick et al.

(10) Patent No.: US 7,088,405 B2
(45) Date of Patent: Aug. 8, 2006

(54) STRUCTURED TRANSFLECTORS FOR ENHANCED AMBIENT AND BACKLIGHT OPERATION OF TRANSMISSIVE LIQUID CRYSTAL DISPLAYS

(75) Inventors: Keith M. Kotchick, Saint Paul, MN (US); Kenneth A. Epstein, Saint Paul, MN (US); Patrick H. Marushin, Saint Paul, MN (US); Donald J. McClure, Shoreview, MN (US); Andrew J. Ouderkirk, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/429,601

(22) Filed: May 5, 2003

(65) Prior Publication Data

US 2004/0223099 A1 Nov. 11, 2004

(51) Int. Cl.
G02F 1/1335 (2006.01)

(52) U.S. Cl. .......................... 349/114; 349/64; 359/15; 359/584; 359/599

(58) Field of Classification Search ............ 349/61, 349/63, 64, 112, 113, 114, 96; 359/15, 584, 359/586–590, 599, 629, 634, 639, 640, 831, 359/833, 834
See application file for complete search history.

(56) References Cited

U.S. PATENT DOCUMENTS

| | | | |
|---|---|---|---|
| 4,298,249 A | | 11/1981 | Gloor et al. |
| 4,488,775 A | * | 12/1984 | Yamamoto ............... 359/588 |
| 4,989,125 A | | 1/1991 | Cobb, Jr. et al. |
| 5,128,787 A | | 7/1992 | Blonder |
| 5,659,408 A | | 8/1997 | Wenyon |
| 5,771,328 A | * | 6/1998 | Wortman et al. ............ 385/146 |
| 5,818,554 A | | 10/1998 | Hiyama et al. |
| 5,926,293 A | | 7/1999 | Ralli |
| 5,936,751 A | | 8/1999 | Wenyon |
| 6,166,793 A | | 12/2000 | Hayashi et al. |

(Continued)

FOREIGN PATENT DOCUMENTS

EP 0843195 5/1998

(Continued)

OTHER PUBLICATIONS

Valliath et al., "44.5L: *Design of Hologram for Brightness Enhancement in Color LDCs*", *SID 98 Digest*, pp. 1139-1142.

*Primary Examiner*—Toan Ton
*Assistant Examiner*—Tai Duong
(74) *Attorney, Agent, or Firm*—Stephen W. Buckingham

(57) ABSTRACT

Color transmissive displays have historically used only backlight for forming the color image, and have not used ambient light. Usually, such a display is not used in bright sunlight, since the color image becomes washed out. Transflective color displays form an image by reflecting ambient light or by transmitting backlight, and can be used in bright sunlight. The transflector in such displays reflects the ambient light while also transmitting the backlight. The requirements on the transflector, however, are different from those used in monochromatic displays. According to the invention, a color transflective display device uses comprises a transmissive display unit having a viewing side and a back side and defining picture elements. A structured transflector is disposed to the back side of the color display unit. The structured transflector includes a structured surface and a layered dielectric reflector disposed over the structured surface.

30 Claims, 11 Drawing Sheets

U.S. PATENT DOCUMENTS

| | | |
|---|---|---|
| 6,204,903 B1 | 3/2001 | Hayashi et al. |
| 6,429,983 B1 | 8/2002 | Molsen |
| 6,831,719 B1 * | 12/2004 | Jang et al. .................. 349/114 |
| 6,870,586 B1 * | 3/2005 | Iijima ........................ 349/114 |
| 6,975,455 B1 * | 12/2005 | Kotchick et al. ........... 359/487 |
| 2003/0020856 A1 | 1/2003 | Furuhashl et al. |
| 2003/0035231 A1 | 2/2003 | Epstein et al. |

FOREIGN PATENT DOCUMENTS

| | | |
|---|---|---|
| EP | 0883015 | 12/1998 |
| WO | WO 01/75517 | 10/2001 |

* cited by examiner

STRUCTURED TRANSFLECTORS FOR ENHANCED AMBIENT AND BACKLIGHT OPERATION OF TRANSMISSIVE LIQUID CRYSTAL DISPLAYS

FIELD OF THE INVENTION

This invention relates generally to displays, and particularly to transflective displays that operate under ambient lighting and also with backlighting.

BACKGROUND

The physical downsizing of microprocessor-based technologies has led to the development of portable personal computers, pocket secretaries, wireless phones, and pagers. All of these devices, and other devices such as clocks, watches, calculators, etc., have the common need for a data display screen having low power consumption in order to extend the useful working period between battery replacements or battery charging.

The most common type of display in such devices is the liquid crystal display (LCD). LCDs may be classified based upon the source of illumination. Reflective displays are illuminated by ambient light entering the display from the front. A reflective surface, such as a brushed metal reflector placed behind the LCD returns light that has been transmitted through the LCD while preserving the polarization orientation of the light incident on the reflective surface. Although reflective displays meet the need for low power consumption, the displays are only useful under good ambient lighting conditions. Under low levels of ambient light, the display often appears dark and is difficult to read. Therefore, the purely reflective display has limited utility.

Another type of LCD display is a backlit display, in which light is generated behind the display and is transmitted through the display to the viewer. Typically, the backlight assembly includes a light source, such as a light-emitting diode (LED), a fluorescent lamp, or other device that emits light, and some optical elements to direct the light from the light emitter to the LCD. Backlighting may also be used to supplement a reflective display so that it can be used over a wide range of ambient light conditions. However, the introduction of a backlit assembly increases the power drain on the battery, significantly reducing the useful battery life, or the time between battery chargings.

The combination of backlighting with an ambient reflective display introduces the need for a "transflective" film. The transflective film is placed between the LCD and the light source, and is used for reflecting ambient light that has been transmitted through the LCD and transmitting light from the light source to illuminate the LCD.

SUMMARY OF THE INVENTION

Under ambient lighting conditions, however, a transflective film often gives rise to a specular reflection of the incident light overlapping the image, thus making the image harder to view. This is particularly the case when the display is a color display operating in the backlit mode, and there are high levels of ambient light. Accordingly, there is a need for an improved transflector that improves the viewability of the image of a color display when operating with high levels of ambient light. The transflector reflects and transmits light with reduced color shift and may be structured so as to spread the reflected ambient light over a desired angular range.

In one particular embodiment, the invention is directed to a transflective display device that comprises a transmissive display unit having a viewing side and a back side and defining picture elements. A light source is disposed to the back side of the transmissive display unit. A structured transflector is disposed between the transmissive display unit and the light source. The structured transflector includes a structured surface and a layered dielectric reflector disposed over the structured surface.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
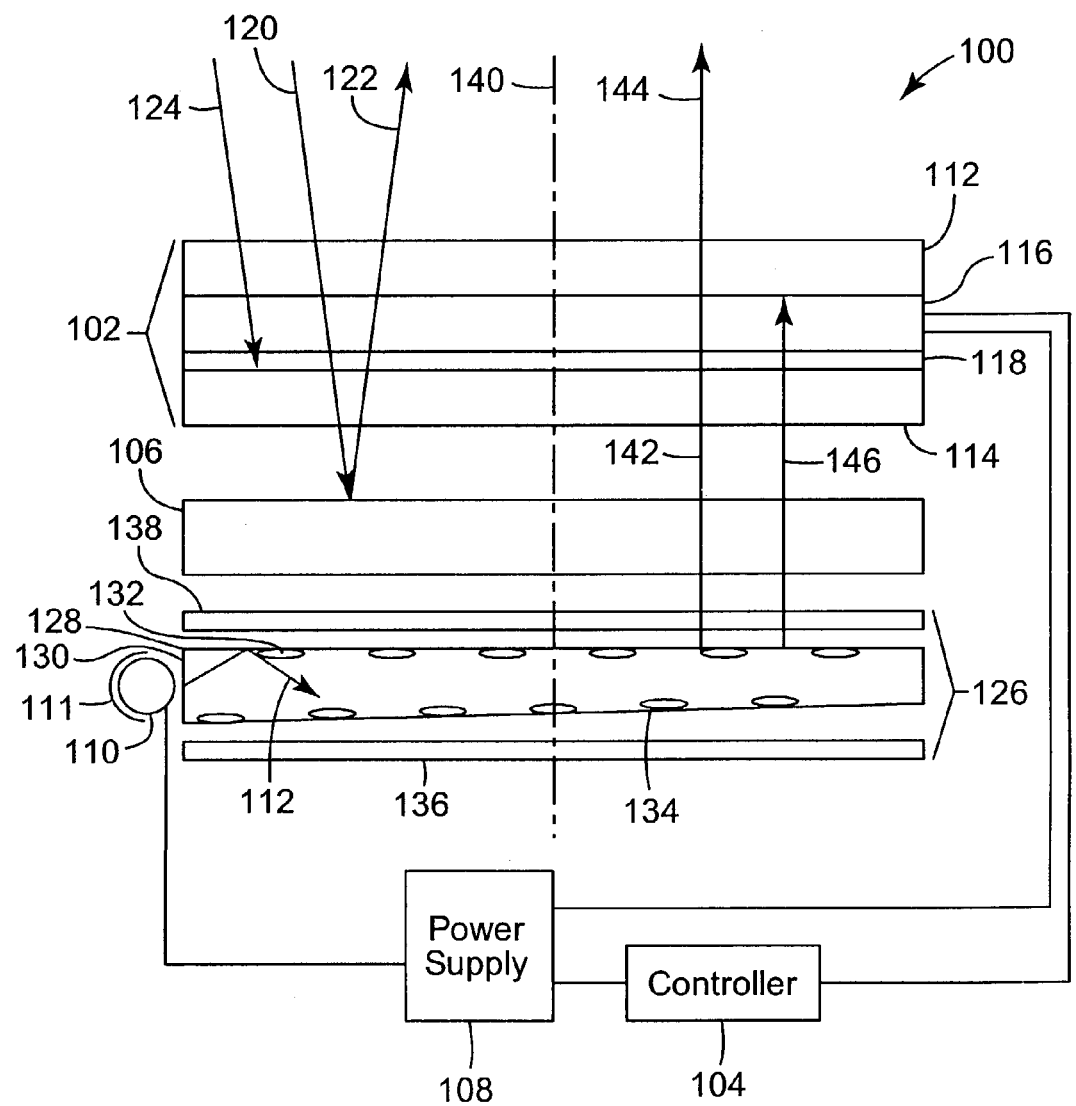
FIG. 1 schematically illustrates an embodiment of a transflective display according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to transflective displays and is believed to be particularly useful for color transflective displays in which the reflected image light is separated from ambient glare, thus improving the viewability of the image seen by the viewer.

A schematic representation of a transflective display 100 is illustrated in FIG. 1. A display unit 102, typically a liquid crystal display (LCD) or the like, is connected to a controller 104 which controls the information displayed on the display 102. A transflector 106, formed from one or more layers of optical film, is positioned below the display unit 102. A power supply 108 may supply power to the display controller 104, to the display unit 102, and also to a light source 110. The light source 110 may be any suitable type of light source, for example one or more fluorescent tubes, one or more light emitting diodes or the like. The light source 110 may include an optional reflector 111 to aid in directing the light in a preferred direction. The power supply 108 may be a battery, a rechargeable battery, or other source of electrical power.

The display unit 102 typically includes an upper absorbing polarizer 112 and a lower absorbing polarizer 114. A liquid crystal layer 116 is sandwiched between the upper and lower absorbing polarizers 112 and 114. Glass layers (not shown) may be disposed between the absorbing polarizers 112 and 114 and the liquid crystal layer 116. The display unit 102 operates by changing the polarization of certain portions of the light passing therethrough. A color filter 118 is typically used to provide specific color to specific pixels of the display unit 102.

Color displays normally operate in the backlit mode. Under conditions of strong ambient light such as strong sunlight, however, color displays are difficult to view and the image appears washed out. Under such circumstances, it is useful to use a combination of both backlight and ambient light for forming the image, which appears brighter and more easy to see when ambient light is strong. The transflector 106 reflects ambient light that has passed through the display unit 102 and it transmits light to the display unit 102 that has been generated by the backlight. Thus, the display 100 is able to operate using either backlight, ambient light, or both.

The operation of the display 100 with respect to light of different polarization states is now described. Ambient light 120 in a polarization state that is transmitted through the absorbing polarizer 112 is transmitted through the liquid crystal layer 116 to the lower absorbing polarizer 114. Where the light that has passed through the liquid crystal layer 116 is in a polarization state passed by the lower absorbing polarizer 114, the light is transmitted through to the transflector 106. The light reflected 122 from the transflector 106 passes back through the display unit 102 and is viewed by the viewer. At other places on the display unit 102, the light 124 passing into the liquid crystal layer reaches the lower absorbing polarizer 114 in a polarization state that is absorbed. Thus, no light reaches the viewer from this point in the display unit 102. Thus, by controlling pixels of different colors to either block light or reflect light, an image of reflected light is presented to the viewer.

Ambient light incident (not shown) on the upper absorbing polarizer 112 in the other polarization from light 120 and 124 is absorbed by the upper polarizer 112.

A backlit image is formed for the viewer as follows. The light source 110 generates light 112 that enters the backlight unit 126. In the illustrated embodiment, the backlight optics unit 126 may comprise a light guide 128 for guiding light across the display 100 from the light source 110, which may be provided with a reflector, and for emitting light upwards towards the display unit 102. In one embodiment, the light guide 128 may comprise a transmissive wedge having its thick end 130 illuminated by the light source 110. Diffusive or diffusely reflective pads 132, 134 along one or both the upper and lower surface of the light guide 128 may be used to extract light from the light guide 128 towards the display unit 102. The backlight unit 126 may also include a reflector 136 below the light guide 128, to reflect light that is transmitted through the lower surface of the light guide 128. The reflector 136 may be a diffuse reflector or a specular reflector.

The backlight unit 126 may also include one or more light management optical films 138 for managing the light passing to the display unit 102. For example, the light management optical films may include one or more prismatically ribbed brightness enhancing films for steering the light more closely to the display axis 140. One approach is to use two layers of prismatic brightness enhancing film, with the direction of the prismatic ribs one layer oriented approximately perpendicular to those of the other layer, so as to steer the light in two dimensions towards the display axis 140. The backlight unit 126 may also include a reflective polarizer for reflecting light back to the diffuse reflector 136 that would otherwise be absorbed in the lower absorbing polarizer 114.

Some light 142 emitted towards the transflector 106 is transmitted through the lower absorbing polarizer 114 and through the liquid crystal layer 116. The polarization of the light emitted from the liquid crystal layer 116 into the upper absorbing polarizer 112 is in a polarization state that is passed by the upper absorbing polarizer 112, and is emitted as image light 144 towards the user. Other light 146 transmitted towards the display unit 102 is transmitted through the lower absorbing polarizer 114 and is incident on a different portion of the liquid crystal layer 116. In this case, the light 146 reaches the upper absorbing polarizer 112 in a polarization state that is absorbed by the upper absorbing polarizer 112, and is not viewed by the user. Thus, spatially selective polarization control of the light passing through the display unit 102 from the backlight unit 126 results in the user viewing an image formed by light emitted from the light source 110.

It will be appreciated that, in some conditions, the transflector 106 may not reflect 100% of the incident ambient light, and may not transmit 100% of the incident backlight. This permits the display 100 to operate as a non-inverting display in which, for example, a lit blue pixel remains a lit blue pixel for both ambient and backlit illumination.

It is useful to review the differences between monochromatic and color displays before discussing the transflector 106. Monochromatic displays are commonly used in portable devices such as watches, cell phones and the like. The type of information displayed on monochromatic displays is often alphanumeric in character, with little in the way of graphical information. Such information does not need high spatial or gray scale resolution, or require constant color characteristics, and so the large variations in the characteristics of ambient light, for example when experienced by moving among sunlight, fluorescent lighting, and incandescent lighting, have little effect on the quality of the images produced by a monochromatic display. Accordingly, the common default mode of operating a monochromatic display is under ambient illumination and, to increase battery lifetime, the backlight is only used as a supplement when there is insufficient ambient light. The transflector in monochrome displays has commonly had a reflectivity in the range of 60% –90%. Furthermore, the use of a backlight in monochromatic systems sometimes results in an inversion of the color of the image: what appeared to be dark on light under ambient lighting becomes light on dark under backlighting. For a monochromatic display, such inversion may be inconvenient to the user, but still maintains a viewable image.

Color displays have requirements that are much more exacting than for a monochromatic display. First, it is important to maintain the color balance in the displayed image, irrespective of the ambient lighting conditions: the user would be unlikely to favor a display in which the colors of a particular image changed significantly on moving from a room illuminated with incandescent light to one illuminated by fluorescent light. One application where color displays have become commonly used is in laptop computers. Displays in laptop computers are usually transmissive displays, using only backlight illumination to form the image. This ensures constant color balance and gray scale. Under conditions of strong ambient light, for example direct sunlight, the image on a purely transmissive display becomes washed out because of a lack of contrast between the image and the ambient light reflected from the display screen. Therefore, under some lighting conditions, the purely transmissive display becomes unusable.

The addition of a transflector to a color display provides for image formation using the incident ambient light, in addition to the backlight. Thus, the color display is able to operate in a wider variety of lighting conditions. Since the default mode of operating a color display is usually the backlit mode, the transflector 106 transmits a significantly higher fraction of the backlight than in a monochromatic display. For example, the transmission through the transflector is in the range from about 10%–99%, with a preferred range being from about 70% to about 90%. Assuming that there is no absorption in the transflector 106, this leads to a transflector reflectivity in the range from about 10% to about 30%.

Furthermore, color inversion in a color display results in the production of an image that looks like the color negative produced by photographic film. Such images are usually unacceptable to the user, and so the types of transflector usable with a color display are non-inverting transflectors. The use of a non-inverting transflector, such as a partial reflector/partial transmitter, permits the addition of the ambient image to the backlit image, which permits the display to be used under a combination of both ambient and backlit illumination.

Figure 2A:
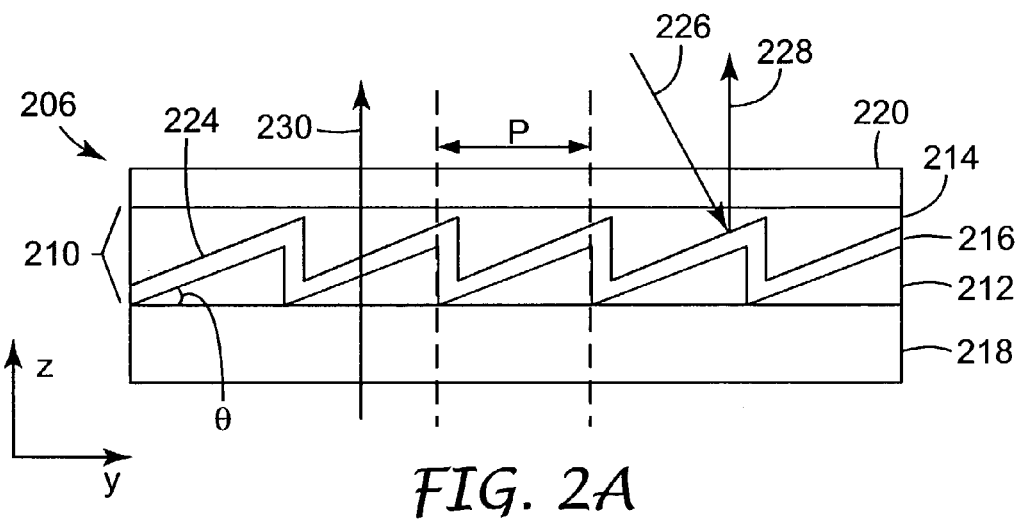
FIGS. 2A–2C schematically illustrate cross-sections through different embodiments of transflector according to principles of the present invention.

A schematic cross-section through one particular embodiment of a non-inverting transflector 206 is presented in FIG. 2A. A transflector layer 210 comprises a first microstructured layer 212 and a second microstructured layer 214. Between the two microstructured layers 212 and 214 is a partial dielectric reflector 216, that fits to the forms of the microstructured layer 212 and 214. The microstructured layers 212 and 214 are typically formed from optically transparent polymer materials.

Although metallic partial reflectors find widespread use for transflectors in monochromatic displays, metallic transflectors are less well suited to use with color displays. In monochromatic displays, the reflectivity of the transflector is relatively high, for example in the range from 60%–90%. As a result, the metallic transflector is fabricated from a relatively thick layer of metal.

In the color display, the reflectivity of the partial reflector is lower, and may be in the range 10%–30%. A metallic partial reflector having a reflectivity in this range has a number of disadvantages. The reflectivity of a metallic layer is dependent on its thickness: such a low reflectivity requires a very thin metal film, which is difficult to deposit uniformly. Also, the color of a metallic partial reflector having low reflectivity is different from one having higher reflectivity. For example, a thin silver coating with low reflectivity transmits a higher fraction of blue light than a higher reflectivity coating, giving an overall yellow appearance to a reflected image. In addition, a thin metallic layer is lossy, with a few percent of the light being lost due to absorption.

Pearlescent and pigment reflectors are also not well suited for use with color LC displays. The levels of reflectivity and diffusivity are generally linked, and so the design parameters of the display unit are severely constrained. Furthermore, the polarization of the scattered light may not be preserved, thus introducing further losses into the polarization-dependent LC display.

A preferred approach to providing the partial dielectric reflector 216 is to provide a layered dielectric structure. A layered dielectric structure includes a number of dielectric layers having a different refractive index. One example of a layered dielectric reflector 216 is a single layer of a relatively high refractive index material disposed over a lower refractive index structured surface. In this case, an overlayer of a material having a relatively low refractive index may be on the other side of the relatively high refractive index layer from the lower refractive index structured surface. Examples of overlayers include air, or a planarization layer such as layer 214.

In another approach, multiple pairs of alternating high and low refractive index material may be provided to form the dielectric reflector. For reflection optimized for a particular wavelength, λ, the different layers have an optical thickness that is an odd number of quarter wavelengths, λ/4. For reflection optimized over a wavelength range, the thicknesses of the layers may be varied. The number, thickness and refractive index of the layers may be selected so as to provide a partial reflector having a desired reflectivity over a selected wavelength range. In addition, the reflectivity of the partial reflector may be tailored to suit a particular angle of incidence on the partial reflector.

Any suitable materials may be used in the layers of high and low refractive index. For example, polymers may be used for the different layers. In addition, fluorinated polymers generally have a low refractive index and may be particularly advantageous for use in the low index layer or layers. Polymers that have dispersed nano-ceramics may have a high refractive index and may be particularly advantageous for use in the high refractive index layer or layers. Non-polymeric, dielectric materials may also be used. Some metallic-based materials useful for the layer or layers of high refractive index include titanium dioxide, tin oxide, indium tin oxide and zinc sulfide. Some non-polymeric materials that may be useful for the relatively low refractive index layer include magnesium fluoride, silicon dioxide and the like.

In embodiments of a transflector having a single layer dielectric reflector, the refractive index of the substrate may lie in the range from approximately 1.3–1.8, and the refractive index of the dielectric reflector lies in the range from approximately 1.8–2.3. If no planarization layer is present, then the refractive index of the material above the dielectric reflector is about 1 if the reflector lies in air. Where a planarization layer is present, the refractive index of the material above the dielectric reflector may lie in the range from approximately 1.3–1.8.

In another approach, referred to as a "pile of plates", the layered dielectric reflector may include a number of layers of dielectric material, whose thicknesses are not necessarily selected so that the optical thicknesses are an odd integer multiple of a particular quarter wavelength. In such a case, reflection between such layers is not necessarily coherent, as is the case for a quarter wavelength stack.

One of the advantages of using a dielectric reflector layer is that unlike the metallic reflector, the color qualities are not directly linked to the value of reflectivity. Instead, the value of reflectivity is related to the refractive index difference between layers and the number of layers. Also, a dielectric reflector does not introduce absorption loss. In addition, diffusive particles may be introduced to the transflector, for example in the reflective layer or layers, or in adjacent layers. The diffusive particles may be formed of a material having a small difference in the refractive index from the host material, and so the size of the scatter angle may be reduced and the amount of depolarization also reduced. Thus, unlike the pearlescent reflector, the level of reflectivity of the dielectric transflector is not linked to the amount of diffusion, thus affording greater design flexibility.

One approach to forming the transflector 206 is to first form one of the microstructured layers 212 and 214 using a suitable technique for forming a microstructured surface. For example, the lower microstructured layer 212 may be formed by using a patterned tool for molding the microstructured layer 212 on the substrate 218. In another approach, the lower microstructured layer 212 may be thermally embossed on the substrate 218. The lower microstructured layer 212 may be made from the same material as the substrate 218, or may be made from a different material from the substrate 218. Once the microstructured surface is formed, the partial reflector 216 is deposited on the microstructured surface. The substrate 218 may be formed from a relatively flexible material, such as a polyester film, a polycarbonate (PC) film, a triacetate cellulose (TAC) film, or the like, or may be formed from a relatively rigid substrate, such as a thick PC layer, an acrylic layer, a glass layer or the like. The substrate 218 may be separate from other components in the display, or may comprise another display component. For example, the substrate 218 may be the lower surface of the display unit, for example a glass layer or absorbing polarizer. In another example, the substrate 218 may be a layer from the backlight optics unit 138, such as a reflective polarizer, for example, a multi-layer reflective polarizer or a cholesteric polarizer. The reflective polarizer may form part of the backlight optics unit 138.

The remaining microstructured layer 214 may then be formed using a planarization process, such as knife coating or calendering roll. The planarization process may use materials such as radiation cured acrylates, or solvent-cast polymers. The upper microstructured layer 214 may be formed with a material that is compatible with long useful life of the partial reflector 216.

Optional layer 220 is an additional adhesive layer that may be used for attaching the transflector 206 to another element, for example the lower absorbing polarizer of the display unit. In another embodiment, layer 220 may be omitted and layer 214 formed from an adhesive material, so that the planarization layer 214 is also an adhesive layer that is capable of attaching the transflector 206 to the lower surface of the display unit 102.

The pitch, P, the length of the angled reflector 224 of the microstructured partial reflector 216, may be selected to reduce Moiré effects formed between the transflector and the display unit 102. The pitch may be selected so that more than one angled reflector 224 is associated with each picture element of the display unit.

The base angle of the angled reflector 224 is labeled as $\theta$. The partial reflector 216 may be constructed to provide selective angular control of the direction of the reflected light 228 from the incident light 226. In this way, incident ambient light passing through the display unit 102 may be directed along a preferred direction and away from glare. Glare tends to arise from specular reflections of the incident ambient light from other surfaces in the display. Transmitted light 230, for example from a backlight, passes through the transflector 206 and, where the refractive indices of the layers 212 and 214 are the same, may pass through the transflector 206 without being refracted. The base angle, $\theta$, is typically in the range 2°–20°, and is more preferably in the range 6°–10°.

Figure 2B:
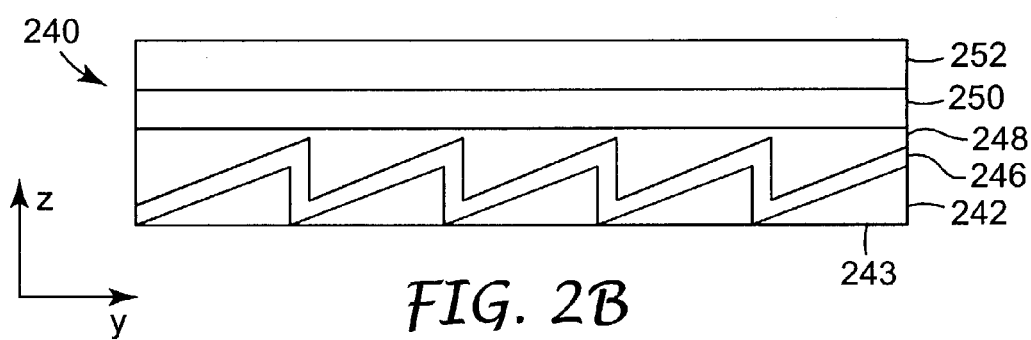

Another embodiment of the transflector 240 is schematically illustrated in FIG. 2B, which shows a substrate 248 attached, via an adhesive layer 250, to the lower layer 252 of the display unit 102. The dielectric reflector 246 is deposited on the substrate 248 and a planarization layer 242 provides a substantially planar lower surface 243 for light passing form the light source to the display unit.

In another embodiment of the transflector 260, a holographic surface 262 is formed on a substrate 264. The holographic surface 262 is covered with a dielectric reflector 266. The dielectric reflector 266 takes on the surface structure of the holographic surface, and functions as a holographic reflector. The dielectric reflector 266 may, because of the shape of the underlying holographic surface, be structured to preferentially reflect light into a direction other than a specular direction. For example, the dielectric reflector 266 may be structured to reflect ambient light 270 incident in a direction of −30° in a direction 272 normal to the transflector 260, rather than in a direction of +30°. The transflector 260 may be provided with a planarization layer 268, which may be an adhesive layer and which may include diffusive particles.

Figure 3:
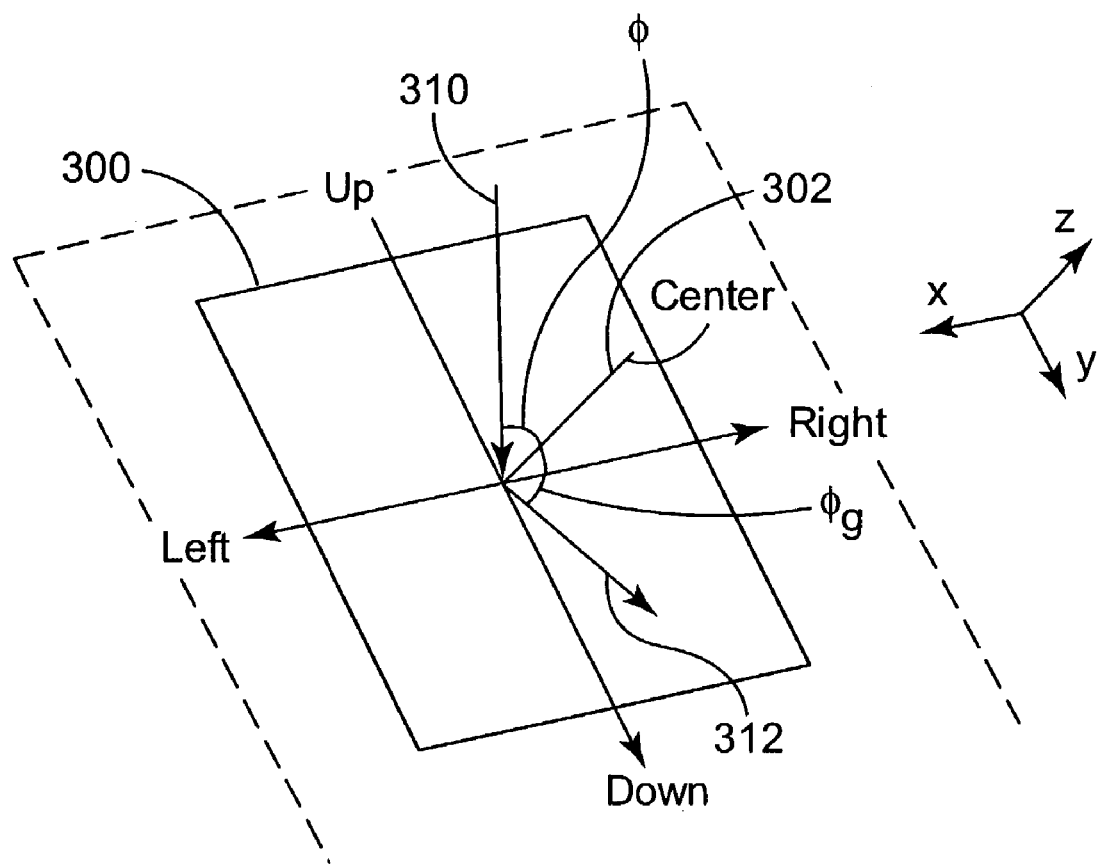
FIG. 3 schematically illustrates a display and co-ordinates used in describing optical paths relative to the display.

It is useful to define directions in which the light propagates relative to the plane of the display. This is done with reference to FIG. 3. The display 300 lies in an x-y plane. The line 302 normal to the display 300 is referred to as the center line, and is parallel to the z-axis. Directions having a component in the +y direction are referred to as down, and directions having a component in the −y direction are referred to as up. Directions having a component in the +x direction are referred to as left, and directions having a component in the −x direction are referred to as right.

It is useful for the reflected image light to be separated from the glare, in which case the base angle, $\theta$, is not equal to zero. Where the angular separation between the glare and the reflected image light is approximately 30°, the base angle, $\theta$, is approximately 10° (light is reflected at an angle approximately equal to 2 n$\theta$, where n is the refractive index of the material in which the light is propagating before and after it is reflected by the reflector).

Figure 4:
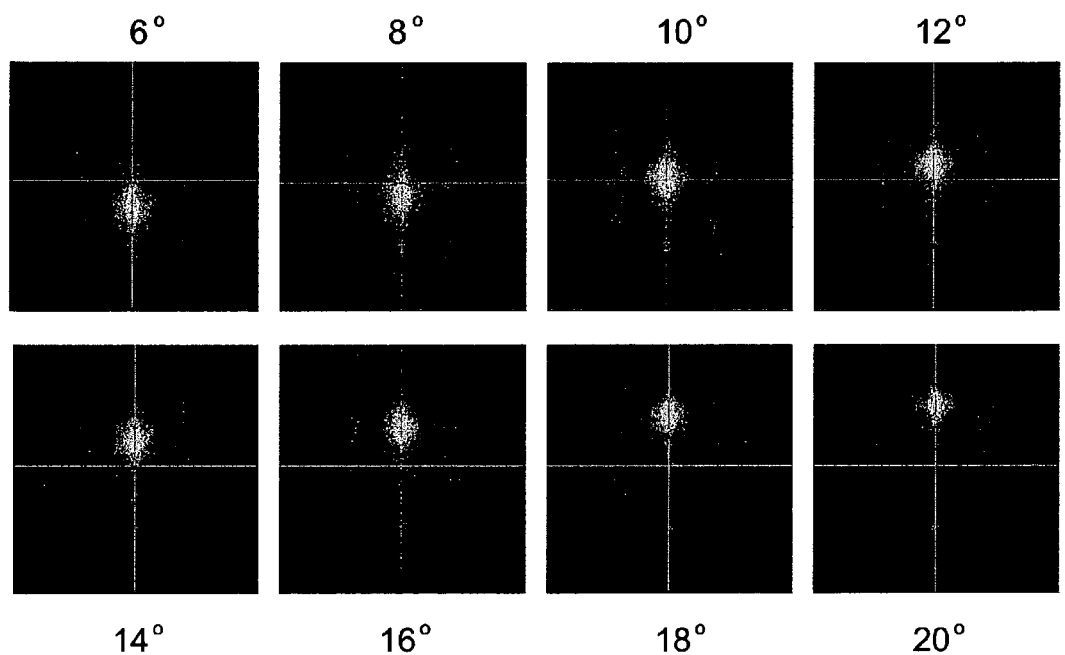
FIG. 4 presents plots showing calculated optical responses of different transflectors as illustrated in FIG. 2A, for various values of base angle from 6° to 20°.

Angular separation between reflected image light and glare are discussed further with respect to the plots presented in FIG. 4. The center of each plot, at the intersection of the axes, represents the center line, parallel to the z-axis. Moving along the axis of each plot represents increasing angles from 0° to 90°. Illumination is assumed to be incident at an angle of 30°, directed from the top of the plot, so that the glare peak 402, representing specular reflection, is at 30° in the downwards direction from center.

The calculated reflection of light from a microstructured transflector is shown as the spot 404a–404h. In (a), the base angle of the angled reflector was assumed to be 6°, increasing by 2° for each successive plot (b)–(h). Thus, (h) represents a base angle of 20°, while (c) represents a base angle of 10°.

The adhesive layer 220, or some other layer, may provide diffusion. For example, the adhesive layer 220 may be provided with diffusing particles in an adhesive matrix. This, however, is typically a rotationally symmetric diffusion, producing the same diffusion angle in the left-right direction as in the up-down direction. In some circumstances, it may be preferred to spread the image light along preferred viewing directions, rather than to have a rotationally symmetric diffusion. In this way, high reflected brightness may be achieved while maintaining high backlight transmission.

Referring again to FIG. 3, in many portable, hand-held devices, for example a hand-held mobile phone, ambient light is typically incident from above, in the up-center plane, exemplified as beam 310. The ambient light is incident on the display 300 at an angle of $\Phi_g$. The resulting glare, which may have some degree of angular spreading due to a small degree of diffusion, is typically centered around the beam 312, also at an angle $\Phi_g$. It is usually preferred, however, to provide the image light to the user in a viewing range around, or close to, the center line. As a result, it may be advantageous to design the display transflector to provide maximum reflected image light in the desired viewing range and with less brightness over other viewing directions.

Figure 5:
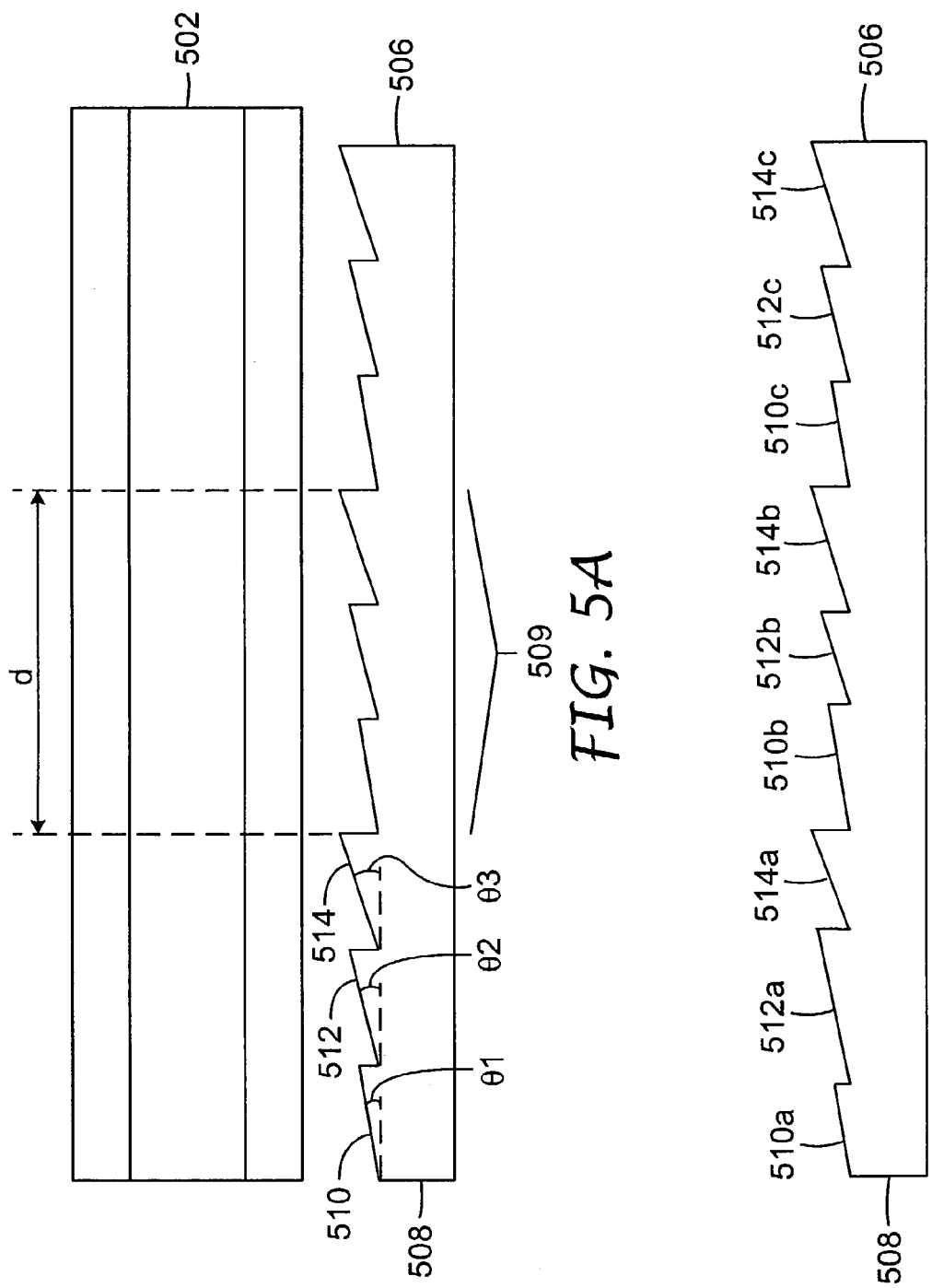
FIG. 5A schematically illustrates a portion of another embodiment of a transflector according to principles of the present invention.
FIG. 5B schematically illustrates a portion of another embodiment of a transflector according to principles of the present invention.

One particular approach to providing selective angular reflective control without relying on a diffuser that scatters light symmetrically in all directions is to use a transflector having angled reflectors at different angles to the plane of the transflector. One embodiment of such a transflector 506 is schematically illustrated in FIG. 5. Only one microstructured layer 508 of the transflector is illustrated, for clarity. It will be appreciated that the partial reflector is disposed to fit the form of the microstructured layer 508, and that a planarization layer may be provided over the partial reflector. In the illustrated embodiment, the transflector 506 comprises sets 509 of three angled reflectors 510, 512 and 514 having respectively different base angles θ1, θ2, and θ3. Such a structure may be used to control the spread of the reflected image light in a plane perpendicular to the axis of the prisms that form the reflectors, through the selection of an appropriate range of prism base angles. The pattern of reflectors may be made to have a unit cell of repetition that is equal to or smaller than the dimension, d, of a display picture element (pixel) of the display unit 502. The set of reflectors 509 may have some other number of reflectors, for example two, four or more.

The set of reflectors 509 may include the reflectors in any desired order. For example, the reflectors may be arranged in order of increasing base angle (as illustrated), decreasing base angle or in a randomized order. Furthermore, the reflectors forming the set of reflectors 509 may all have the same pitch, or may have different pitches, for example as illustrated in FIG. 5B.

Figure 6:
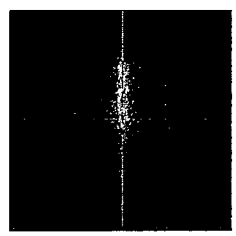
FIG. 6 presents a plot showing a calculated optical response of a transflector having reflectors disposed at a range of angles from 6° to 20°, according to principles of the present invention.

One example of an optical result of including a set of reflectors having different base angles is provided in FIG. 6, which shows a plot similar to that of FIG. 4, but where the unit cell was formed from a number of angled reflectors whose base angles ranged from 6° to 20° in steps of 1°. The viewing angle response is spread primarily in the center-to-up range. Some diffusion was assumed to accommodate some lateral light spread. If, instead, it were preferred to fill in the center-to-down viewing direction, then angled reflectors having base angles in the range of less than 10° may be used.

Figure 7A:
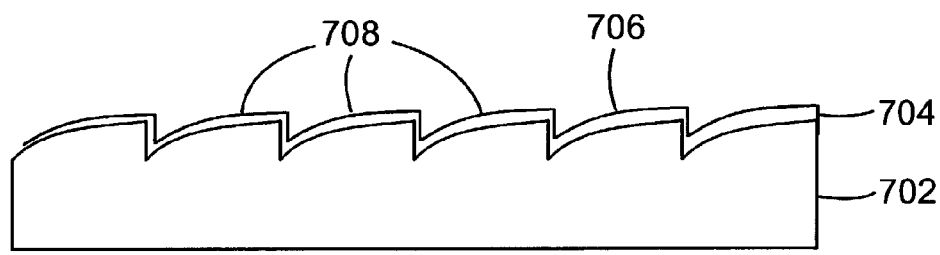
FIGS. 7A and 7B schematically illustrate embodiments of a transflector having non-linear reflecting facets, according to principles of the present invention.

Another approach to providing angular control of the angular range of reflected light is schematically illustrated in FIG. 7A, which shows a microstructured layer 702. The partial reflector layer 704 is deposited over the microstructured layer 702 to have the same form as the microstructured layer 702. A planarized layer (not shown) may be added over the partial reflector.

Figure 7B:
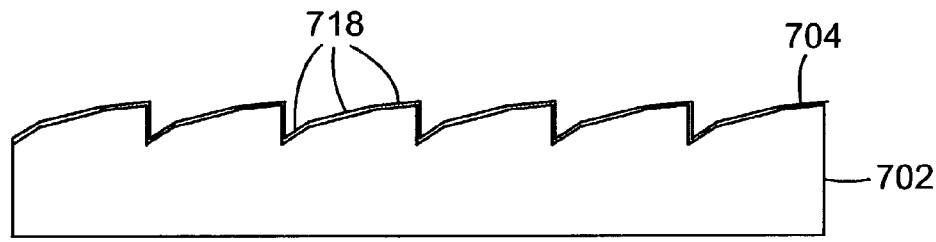

In this embodiment, the reflectors 706 have nonlinear facets 708. The facets 708 may have a radius of curvature, may be non-spherical, or may be a series of discrete linear segments 718, as shown in FIG. 7B. A number of reflectors 706 may be associated with a pixel of the display unit. The reflectors 706 associated with one pixel may have the same non-linear shape, or may have different non-linear shapes.

Figure 7C:
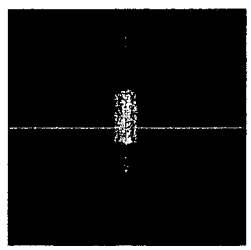
FIG. 7C presents a plot showing a calculated optical response of a transflector having curved reflectors, curving over a range of angles from 6° to 20°, according to principles of the present invention.

A plot showing the calculated performance of a transflector having curved facets covering a range of facet angles from 6° to 20° is shown in FIG. 7C. The filling along the center-to-up direction is evident, with diffusion added only to accommodate a slight lateral spread. Filling of a different range of viewing angles may be achieved using facets with different non-linear profiles.

Some diffusion is often advantageous for providing a degree of viewability in the left-right directions. The amount of lateral spreading may be relatively small relative to the amount of center-up spreading. Under some arrangements, the facets of the reflectors may be modulated to provide some lateral spreading. Such lateral spreading may be provided along with rotationally symmetric diffusion, for example from a bulk diffuser or may be provided without any rotationally symmetric diffusion.

Figure 8A:
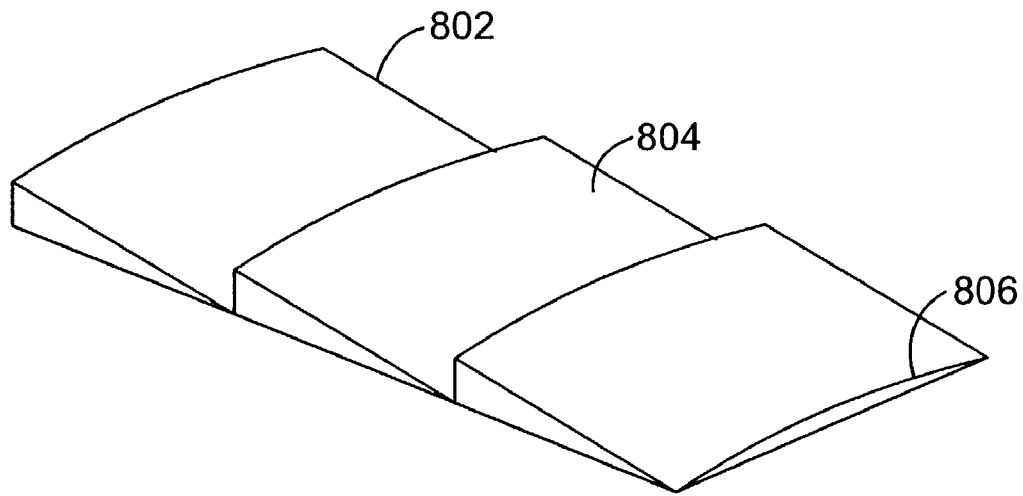
FIGS. 8A and 8B schematically illustrate embodiments of reflectors that provide for lateral light spreading, according to principles of the present invention.
Figure 8B:
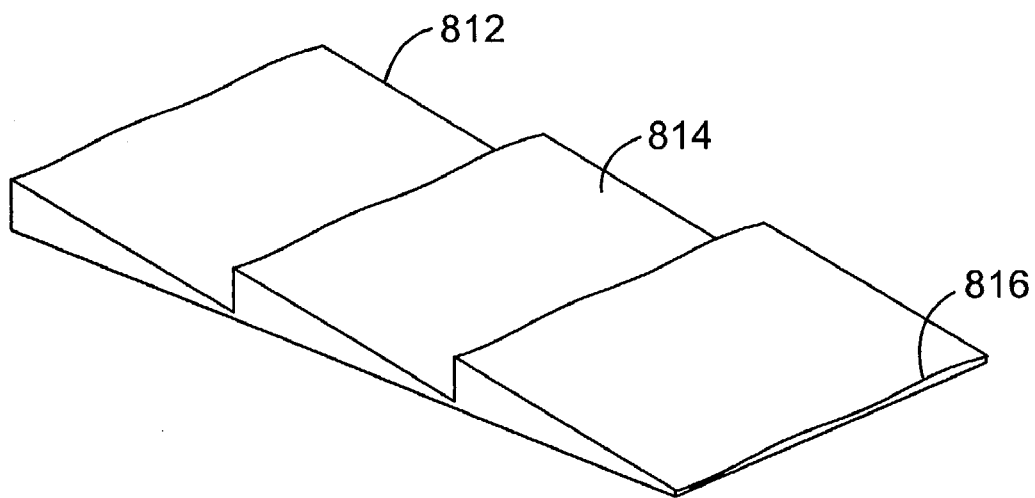

One example of a reflector 802 is schematically illustrated in FIG. 8A, which shows a reflector facet 804 having a generally curved surface 806. Another example of a reflector 812 is schematically illustrated in FIG. 8B, showing a reflector facet 814 having a randomly, or pseudo-randomly curved surface 816. Such surface modulation provides for lateral spreading of the reflected light in a direction perpendicular to the tilt of the reflector facet.

The modulation of the reflector facet may be provided by modulating the depth of the cutting tool when creating the master mold or embossing tool. The modulation may be registered from facet to facet, or may be misaligned, or may be random or pseudo-random from facet to facet. It will be appreciated that lateral diffusion may also be introduced using other approaches, for example using a bulk diffuser layer.

Figure 9:
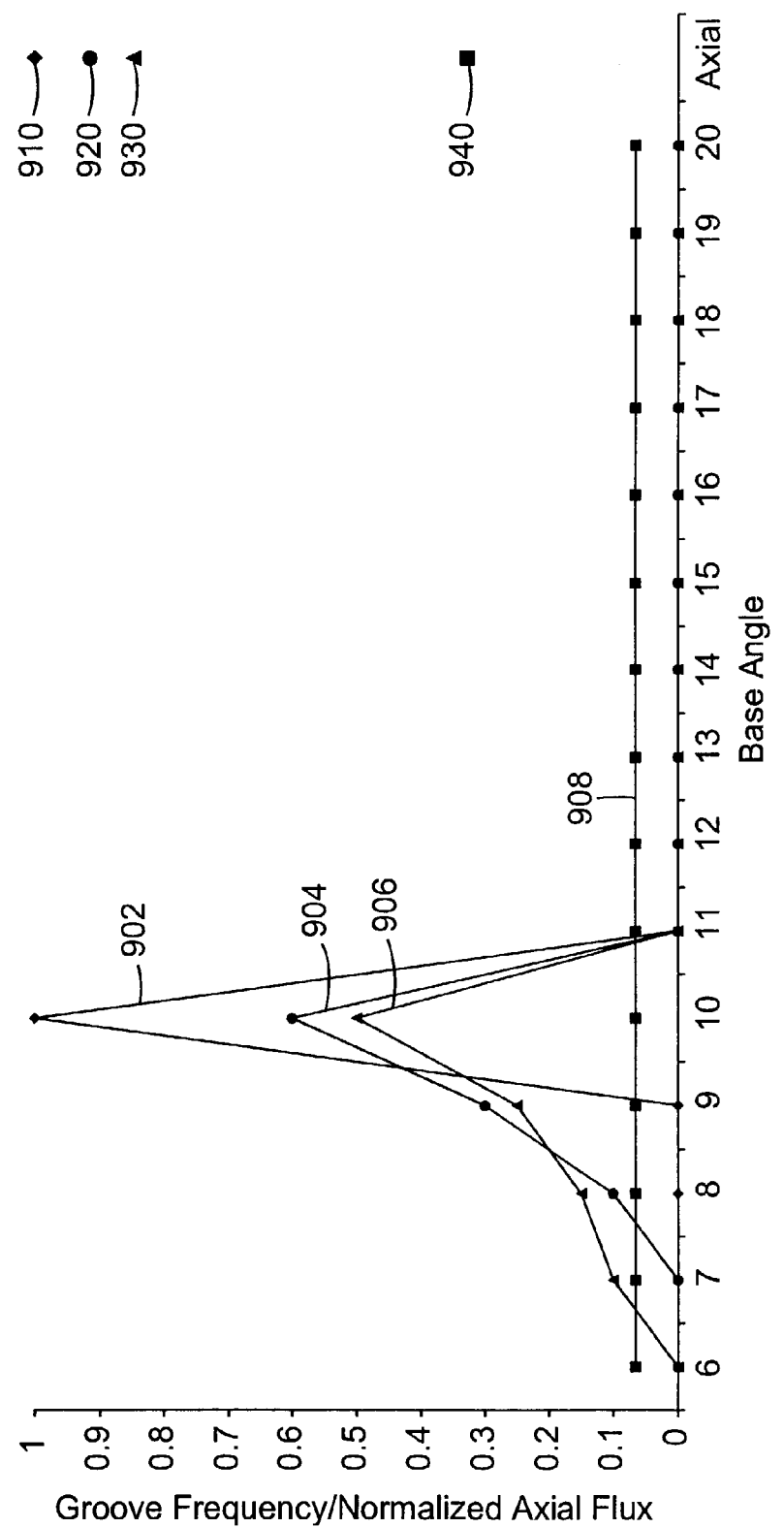
FIG. 9 presents a graph showing the optical effect of transflectors having different combinations of reflectors at different angles, according to principles of the present invention.

In determining the selection of facet angles to be used in the transflector, there may be a case where a certain subset angular viewing range is more preferred over other angles. For example, along the center-to-down direction, a user may desire that the display brightness be highest near the center and correspondingly less as more extreme down positions are sampled. The resulting structure may be different from those illustrated above. The frequency of the base angles or facet curvatures that provide ambient reflectance near center viewing direction are selected to have a higher frequency than those of base angles/curvatures providing ambient reflectance contributing to the extreme down viewing direction. This is described with reference to FIG. 9, which shows the predicted performance of several constructions based on changing the base angle frequency of a collection of flat reflector facets.

In the graph, several sets of different base angle frequencies are shown. Curve 902 shows a microstructured surface having 10° reflector facets only. In this case, the groove frequency is 1.0, or 100% for 10° facets. The resulting normalized axial flux of 1.0 is shown by data point 910. Other patterns are compared against this baseline performance. Curve 904 denotes a microstructured surface with 60% 10° facets, 30% 9° facets and 10% 8° facets. Curve 906 denotes a different frequency of facets with base angles ranging from 10° to 7°. Providing facets at an angle of less than 10° generates a light spread along the down viewing direction. If, however, the frequency of facets having a base angle of less than 10° is reduced relative to the frequency of those facets with a higher base angle, then the axial brightness may be increased.

From curves 904 and 906, the respective axial brightness values are given by data points 920 and 930. By maintaining a larger percentage of 10° facets, a significant portion of the axial brightness performance is maintained while broadening the viewing angle along the center-to-down direction. For comparison, curve 908 denotes the uniform case where the facets of base angles ranging from 6° to 20° have equal frequency. The corresponding axial performance is denoted by point 940. In this configuration, the resulting axial brightness about 30%, significantly lower than in the other cases described.

In another example, not shown, the frequency of facets in the range from 7° to 10° is the same, 25% for each angle. Here the resulting normalized axial brightness is calculated to be 0.728. Although an equal extent of reflector facet angles is sampled by this construction as in the construction assumed for curve 906, the resulting axial brightness is higher for the construction associated with curve 906.

By mixing different frequencies of base angle facets, the reflected angular output of the microstructured transflector may be tuned or optimized along a preferred viewing direction, independent of added symmetric diffusion, to meet the specific requirements of the particular viewing device being used.

It will be appreciated that the microstructured transflectors described so far operate in a "grooves up" orientation. In other words, the ambient light first strikes the facet side of the microstructured construction while a plano-surface is on the opposite side. Any or all of the described embodiments may be oriented in a "grooves down" configuration, in which the ambient light first passes through the plano-surface of the transflector before incidence on the microstructured surface. It is preferred that any layer between the display unit's lower polarizer and the transflector be polarization preserving so as to maintain as large a portion of the incident ambient light as possible. Candidate substrates for a "grooves down" configuration may be an isotropic film such as polycarbonate or an absorbing or reflective polarizer. Incorporation of a reflective polarizer can provide the added benefit of polarization recycling for enhanced backlight operation.

EXAMPLE

Figure 2C:
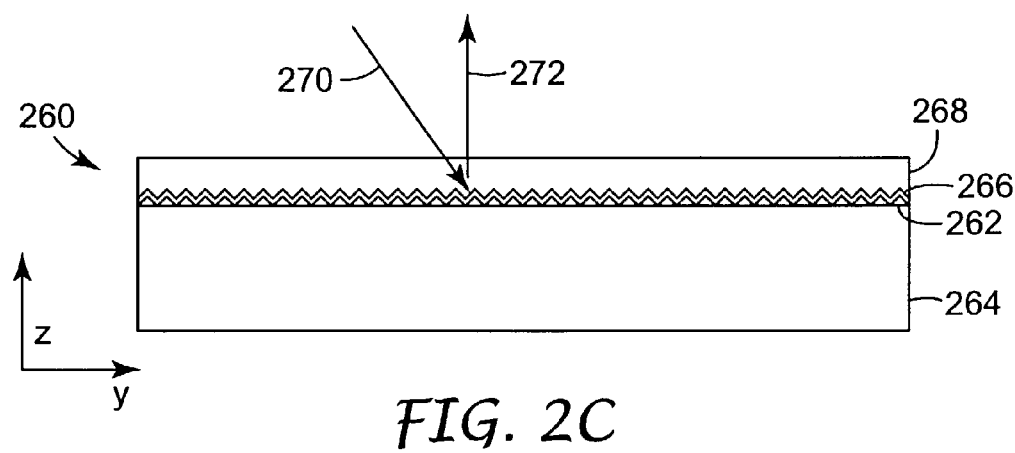

A transflector, like the transflector 206 shown in FIG. 2, was fabricated using a single indium tin oxide (ITO) reflective layer 216 over a first polyester microstructured layer 212 formed on a substrate 218 whose composition was 74 wt. % aliphatic urethane, 25 wt. % hexanediol diacrylate and 1 wt. % Darocur 1173, 2 hydroxy-2-methyl-1 phenyl-propan-1-one, having a refractive index of 1.49. The reflective layer 216 had a quarter-wave thickness at about 550 nm, and had a refractive index of 1.9. The planarization layer 214 was formed from a layer of butyl acrylate adhesive having a refractive index of 1.47. Styrene beads were disposed within the planarization layer 214 to provide some diffusion. The base angle, $\theta$, of the structured layer 212 was 6°.

The example, referred to as sample A, was tested in comparison with two other displays. Sample B was a commercially available transmissive color LC display and Sample C was a commercially available transflective color LC display, A3013T, used in Toshiba cell phones, that had a partial metal reflector positioned within the LC unit itself. The different samples are summarized in Table I

TABLE I

| Sample Descriptions | | |
|---|---|---|
| Sample ID | Sample Identification | Comment |
| A | 6° structured external transflector | Single layer ITO reflector |
| B | OEM Control | Commercially available transmissive TFT-LCD |
| C | A3013T LCD | Internal mirror benchmark |

Spot Light Measurement

A spot light measurement was performed, in which the display was illuminated with a collimated light beam incident on the surface at an angle of 30° to normal, and a detector on a goniometric mount was swept over an angle to measure the light reflected from the display as a function of reflection angle.

Figure 10:
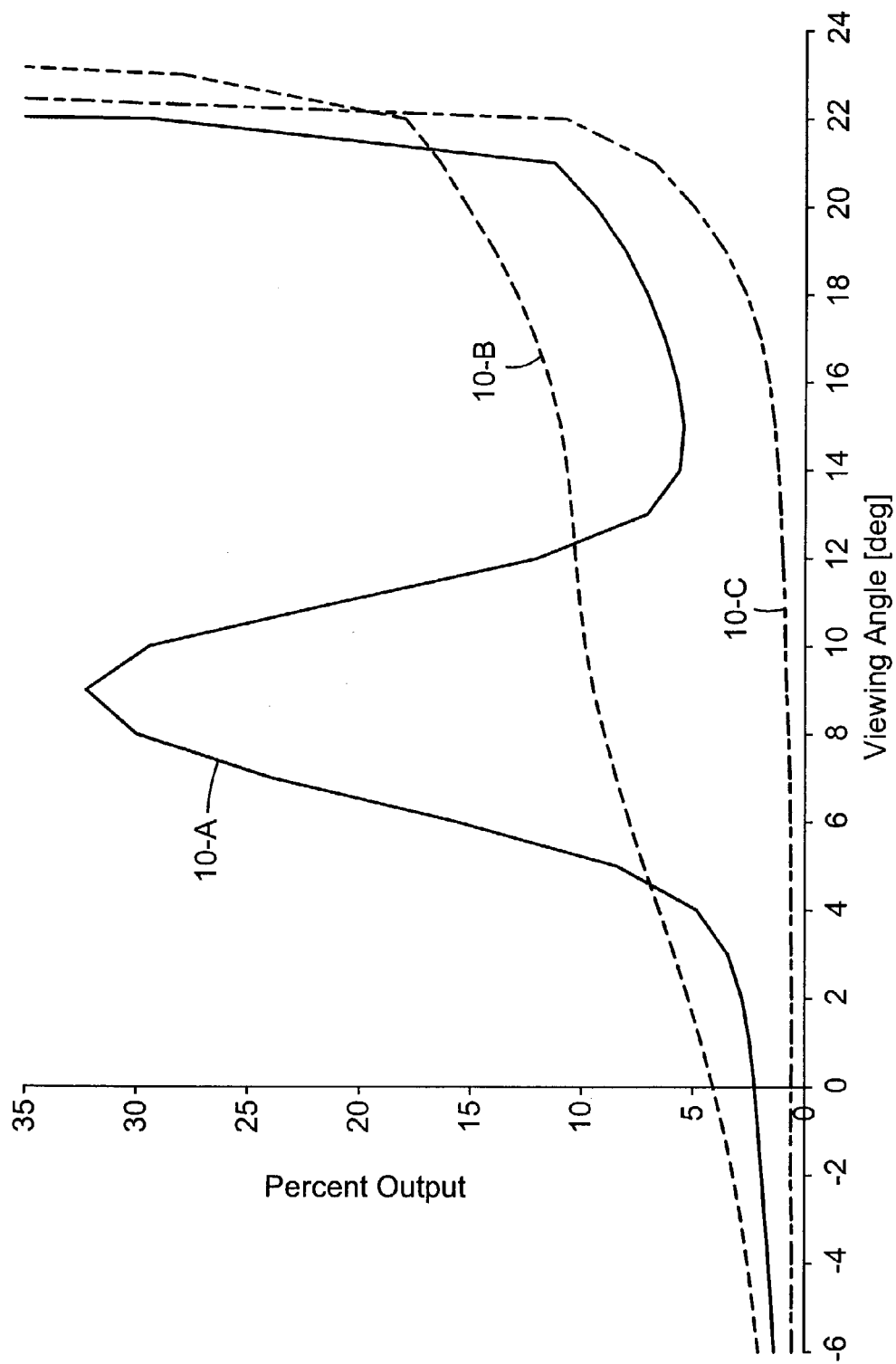
FIG. 10 presents a graph showing experimental results of a spot light test for reflective displays having three different types of transflector.

The goniometric spot light results for the three samples outlined Table I are provided in FIG. 10. All samples showed a large reflection peak centered around +30°, off to the right of the graph, corresponding to specular reflection of the illumination light. The width of this reflection peak was affected by such factors as divergence of the illuminating light and amount of diffusion of the light when reflected. The results are normalized against reflection off a standard white diffuse reflector, Model No. SRS-99-020 manufactured by Labsphere, North Sutton, N.H.

For the internal mirror standard, curve 10-C, a very broad viewing angle was seen with a slight plateau near 10° to 14° from normal. The 6° structured external transflector provided a similar reflected luminance peak but with a narrower viewing angle. Without the beamsteering control of the structured transflector, the flat transflector of the OEM control curve 10B, exhibited an undesired flat response through the viewing range (nominally 0°–15°).

Backlight Illumination

The backlit performance of samples A, B and C were tested using the same backlight assembly. The backlight assembly used an edge-lit lightguide using 3 LEDs, a diffuser sheet, and two brightness enhancing films. A luminance meter, positioned along the display normal, recorded the axial brightness of light transmitted through the display. A luminance ratio calculation of the display under test to the bare backlight yielded the effective transmission of the display system. The results are shown in Table II.

TABLE II

Transmission of Backlight Illumination

| Sample | Effective Transmission |
|--------|------------------------|
| A | 9.4% |
| B | 10.8% |
| C | 4.0% |

Sample A, with a 6° structured transflector, preserved over 86% of the original backlight output, compared to the transmissive display of sample B. This compared very favorably to the transflective display with the internal transflector, sample C. Sample A provided almost 2.4 times the backlight brightness of sample C.

The different components in each sample that contribute to the transmissive losses should be considered to explain the measured difference in backlight transmission. The major components of loss include: absorbing polarizers, aperture ratio (transmissive area through the patterned mirror or around the black matrix), color filters, and LC polarization response. It is assumed that the front and rear absorbing polarizers in Samples A, B and C provide similar transmission, even though sample C uses an anti-reflection treated front polarizer. This AR treatment will only provide a few percent transmission difference, however.

Color Shift (Reflected Light)

Figure 11:
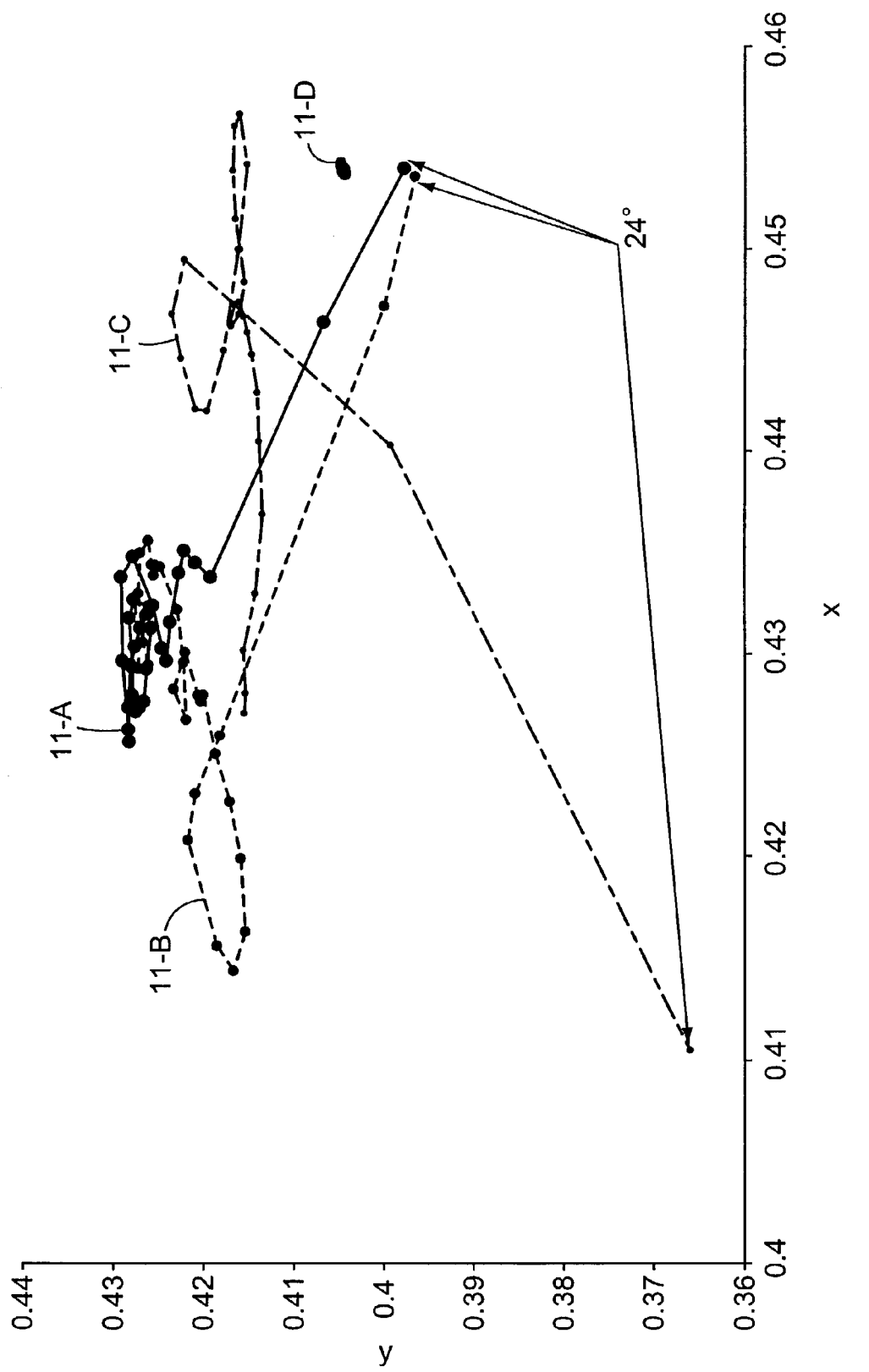
FIG. 11 presents a graph showing color characteristics for ambient light reflected at different angles, for reflective displays having four different types of transflector.
Figure 12:
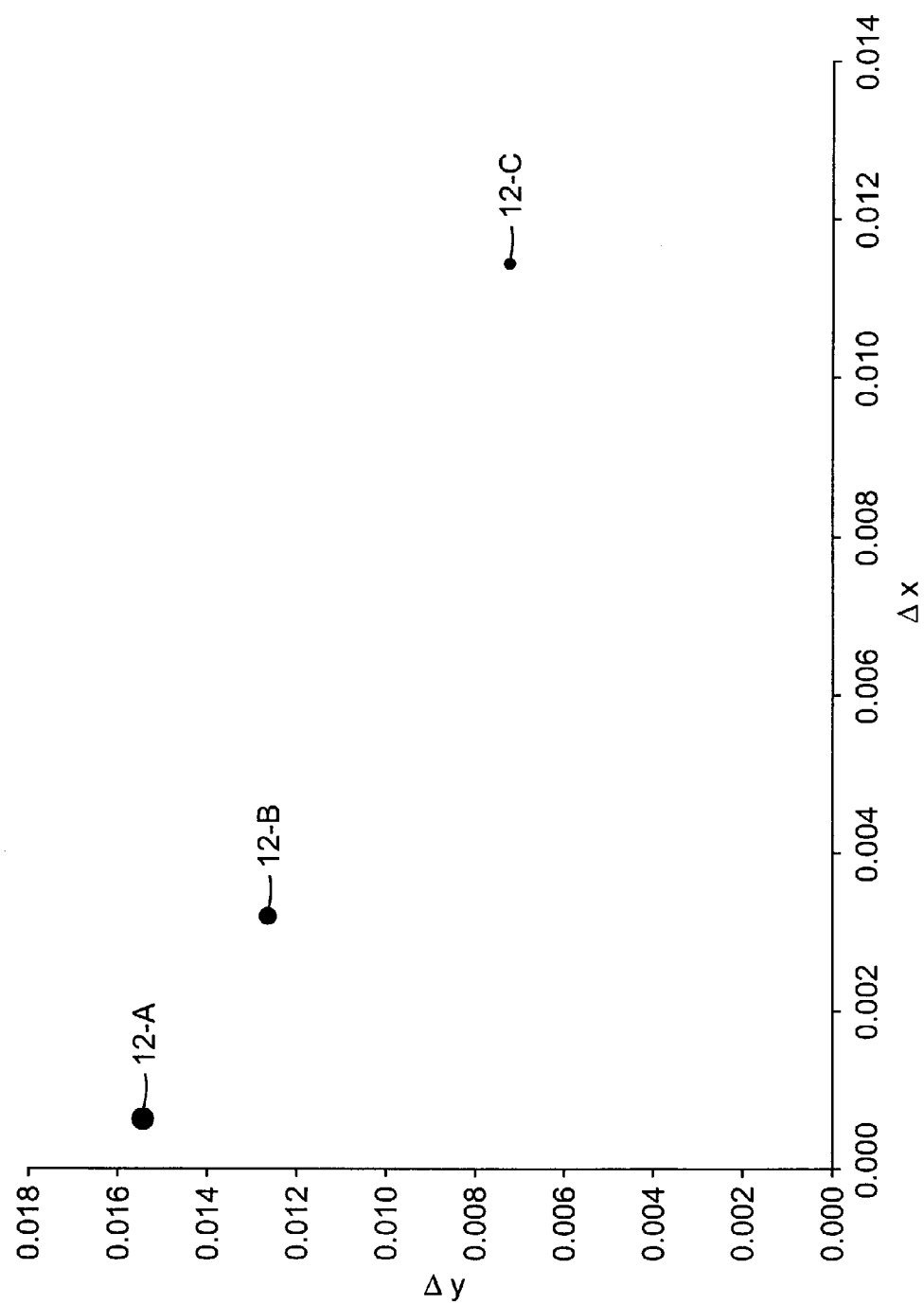
FIG. 12 presents a graph showing color shift in backlight operation for reflective displays having three different types of transflector.

The color of the light reflected during the spot light test was measured, as a function of angle. The color was determined for each angle measured, and the color of the light reflected at each angle is plotted in the color diagram in FIG. 11 as an (x, y) co-ordinate. Curves 11-A, 11-B, 11-C, are shown for each sample, along with a set of (mostly superimposed) points for reflection off the white diffuse reflection standard, shown as 11-D. There is very little shift in the color of light reflected from the reflection standard, as the angle of detection is varied.

For each of the curves 11-A, 11-B and 11-C, the point that corresponds to a measurement made at 24°, approaching the glare peak at 30°, is marked. The measurements were made at 1° intervals over the range −6°–24°, corresponding to the measurements made to produce FIG. 10. The spread of the points for sample A is relatively small, apart from the two points closest to 24°, indicating that there is little color shift in the ambient image over the range. There is substantially more spread for curves 11-B and 11-C, indicating that the ambient image for these displays shows more color shift as a function of angle than for sample A. The spread in the points in curve 11-A may be reduced further with optimization of the thickness of the single ITO layer and/or with the addition of further layers in the dielectric partial reflector.

Color Shift (Transmitted Light)

The color of the light transmitted through the different sample displays was measured. For these measurements, the color of the backlight, operating without a display module, was first measured, thus establishing a color standard against which the different display samples compared. A chromaticity meter was positioned along the display normal, and the color of the light transmitted through the different sample displays was recorded. The axial color difference was calculated using the 1931 CIE chromaticity space.

Visually, sample A provided very little change as evidenced by the small change in both x and y color coordinates from the bare backlight baseline. Sample C, the internal mirror display, showed the largest color shift.

As noted above, the present invention is applicable to transflective liquid crystal displays and is believed to be particularly useful for reducing the specular reflection of ambient light that overlaps the image. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A transflective display device, comprising:
   a color transmissive display unit having a viewing side and a back side and defining picture elements, the display unit comprising a liquid crystal display unit having a liquid crystal layer disposed between first and second absorbing polarizers;
   a backlight unit to generate backlight; and
   a structured transflector disposed between the backlight unit and the color display unit, at least some of the backlight passing through the structured transflector to the color display unit, the structured transflector including a structured dielectric reflector to reflect ambient light that has passed through the color display unit at a reflection angle different from an incident angle, the reflection and incident angles being measured relative to a display normal.

2. A device as recited in claim 1, wherein the dielectric reflector has a transmission in the range of 70% –90%.

3. A device as recited in claim 1, wherein the structured reflector defines a plurality of sets of reflective facets, the reflective facets being nonperpendicular to an optical axis of the display device, the different sets of reflective facets being associated with respective different picture elements, the sets of reflective facets comprising at least two reflective facets.

4. A device as recited in claim 3, wherein the reflective facets of the plurality of sets of reflective facets are substantially rectilinear, first reflective facets of the sets of reflective facets being disposed at a first angle relative to the optical axis and second reflective facets of the sets of reflective facets being disposed at a second angle relative to the optical axis, a magnitude of the first angle being different from a magnitude of the second angle.

5. A device as recited in claim 4 wherein different reflective facets within at least one of the sets of reflective facets have different lengths.

6. A device as recited in claim 4, wherein base angles of different reflective facets within at least one of the sets are selected so as to provide a desired average reflection angle for the set of reflective facets.

7. A device as recited in claim 4, wherein different reflective facets within at least one of the sets of reflective facets have base angles in the range 2°–20°.

8. A device as recited in claim 7, wherein the base angles are in the range from 6°–10°.

9. A device as recited in claim 3, wherein at least one of the reflective facets is a non-linear facet.

10. A device as recited in claim 9, wherein the at least one of the reflective facets is curved.

11. A device as recited in claim 9, wherein the at least one of the reflective facets has at least two linear segments.

12. A device as recited in claim 1, wherein the structured dielectric reflector is disposed over a holographic surface.

13. A device as recited in claim 1, wherein the structured transflector further comprises a planarization layer disposed over the dielectric reflector and facing the transmissive display unit.

14. A device as recited in claim 13, wherein the planarization layer includes diffusing particles.

15. A device as recited in claim 13, wherein the planarization layer is an adhesive layer adhering the structured transflector to the transmissive display unit.

16. A device as recited in claim 15, further comprising light diffusing particles provided within the adhesive layer.

17. A device as recited in claim 1, further comprising a diffuser disposed between the structured transflector and the transmissive display unit.

18. A device as recited in claim 1, wherein the structured transflector generally lies in an x-y plane, and the structured reflector comprises tilted surfaces tilted relative to the x-y plane so that light normally incident to the x-y plane in a direction parallel to a z-axis, is reflected by the tilted surfaces in a direction having a component lying in a y-z plane.

19. A device as recited in claim 18, wherein at least one of the tilted surfaces is shaped so as to laterally reflect a portion of the incident light to have a directional component in the x-direction.

20. A device as recited in claim 19, wherein the at least one of the tilted surfaces is curved so as to laterally reflect a portion of the incident light to have the directional component in the x-direction.

21. A device as recited in claim 19, wherein the at least one of the tilted surfaces has a randomly varying surface so as to laterally reflect a portion of the incident light to have the directional component in the x-direction.

22. A device as recited in claim 1, wherein the structured reflector includes sets of tilted surfaces, a set of tilted surfaces corresponding to a respective picture element of the transmissive display unit.

23. A device as recited in claim 22, wherein different tilted surfaces within a set of tilted surfaces have different pitches.

24. A device as recited in claim 1, wherein the structured dielectric reflector includes a substrate comprising a material having a relatively low refractive index, and a single layer of material having a relatively high refractive index disposed over the substrate, and further comprising a planarization layer over the structured dielectric reflector, the planarization layer comprising a material of a relatively low refractive index.

25. A device as recited in claim 24, wherein the substrate has a refractive index in the range from approximately 1.3–approximately 1.8, the dielectric reflector includes at least one layer having a refractive index in the range from approximately 1.8–2.3, and the refractive index of the layer on the other side of the dielectric reflector from the substrate is in the range from 1 approximately 1.8.

26. A device as recited in claim 24, wherein the refractive index of the planarization layer is substantially the same as the refractive index of the substrate.

27. A device as recited in claim 1, wherein the structured dielectric reflector is a multilayer dielectric reflector.

28. A device as recited in claim 1, further comprising at least one light management film disposed between the light source and the structured transflector.

29. A device as recited in claim 1, further comprising a control unit coupled to the display unit to control an image displayed on the display unit.

30. A device as recited in claim 1, wherein the structured transflector includes reflecting facets set at a base angle in the range 2° and 20°.

* * * * *

UNITED STATES PATENT AND TRADEMARK OFFICE
CERTIFICATE OF CORRECTION

| | | |
|---|---|---|
| PATENT NO. | : 7,088,405 B2 | Page 1 of 1 |
| APPLICATION NO. | : 10/429601 | |
| DATED | : August 8, 2006 | |
| INVENTOR(S) | : Keith M. Kotchick | |

It is certified that error appears in the above-identified patent and that said Letters Patent is hereby corrected as shown below:

Column 1, page 2 (U.S. Patent Documents) - line 6 - Delete "FuruhashI et al." and insert --Furuhashi et al. --, therefor.

Column 16, Line 19 (approx.) - in Claim 25, after "1" insert -- to --.

Signed and Sealed this

Twenty-first Day of November, 2006

JON W. DUDAS
*Director of the United States Patent and Trademark Office*